(12) United States Patent
Flynn et al.

(10) Patent No.: US 8,195,691 B2
(45) Date of Patent: Jun. 5, 2012

(54) QUERY-BASED TREE FORMATION (75) Inventors: James Randall Flynn, Seattle, WA (US); Shung Lai Franky Lam, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 259 days.

(21) Appl. No.: 12/642,668

(22) Filed: Dec. 18, 2009

(65) Prior Publication Data

US 2011/0153666 A1 Jun. 23, 2011

(51) Int. Cl.
G06F 17/30 (2006.01)
(52) U.S. Cl. .................................. 707/778; 707/779
(58) Field of Classification Search .................. 707/778, 707/779
See application file for complete search history.

(56) References Cited

U.S. PATENT DOCUMENTS

| | | | | |
|---|---|---|---|---|
| 5,317,742 A * | 5/1994 | Bapat | ............................. | 707/714 |
| 5,890,150 A * | 3/1999 | Ushijima et al. | ............... | 707/714 |
| 6,708,164 B1 * | 3/2004 | Cseri et al. | ...................... | 707/778 |
| 6,785,673 B1 | 8/2004 | Fernandez et al. | | |
| 6,816,858 B1 * | 11/2004 | Coden et al. | ................... | 707/750 |
| 6,862,589 B2 * | 3/2005 | Grant | ............................. | 707/779 |
| 6,928,428 B1 * | 8/2005 | De Vries | ........................ | 707/749 |
| 7,359,910 B2 | 4/2008 | Wu et al. | | |
| 7,539,697 B1 * | 5/2009 | Akella et al. | ........................... | 1/1 |
| 7,685,141 B2 * | 3/2010 | Jadhav et al. | ............... | 707/999.1 |
| 2008/0172408 A1 | 7/2008 | Meliksetian et al. | | |
| 2009/0125530 A1 | 5/2009 | Martinsson et al. | | |
| 2009/0132968 A1 | 5/2009 | Nan et al. | | |
| 2009/0164947 A1 | 6/2009 | Taylor et al. | | |
| 2009/0271370 A1 * | 10/2009 | Jagadish et al. | ................... | 707/3 |

OTHER PUBLICATIONS

Chen et al., XTree: a Declarative Query Language for XML—Published Date: Dec. 1, 2005 http://www.comp.nus.edu.sg/~lingtw/papers/TRA1.05.XTree.pdf (49 pages).
Visokio, Using the Tree View (2.4)—Published Date: 2008 http://www.visokio.com/tree-view (2 pages).
MSDN, How to: View and Modify Work Items in a Tree View—Retrieved Date Oct. 12, 2009 http://msdn.microsoft.com/en-us/library/dd286633(VS.100).aspx (5 pages).
Modeling a Tree in a Document Database—Retrieved Date: Oct. 12, 2009 http://seancribbs.com/tech/2009/09/28/modeling-a-tree-in-a-document-database/ (4 pages).

* cited by examiner

*Primary Examiner* — Kim Nguyen
(74) *Attorney, Agent, or Firm* — Workman Nydegger (57) ABSTRACT

The structuring of data items in a hierarchical structure. A user interface permits a user to define, for each generation of a hierarchical tree, the child characteristics for child data items of particular nodes in the hierarchical tree. Then, a query, or a query template, may be formulated using the child characteristic and the designated parent data item. This may be repeatedly performed to allow for multiple generations of data items to be formed. The query may, at some point, be submitted to identify which data items are child data items or the parent data item. The data items that result from the query (or at least a portion of the data items) may then be assigned as child data items of the parent data item. The query may be postponed until the node is expanded by the user.

12 Claims, 7 Drawing Sheets

QUERY-BASED TREE FORMATION

BACKGROUND

The ability to evaluate information effectively is accepted as a key to success. With the advent of the computing system and the Internet, the amount of available information has increased dramatically. For example, any human being with access to a computing system and a Web browser has access to an almost unlimited amount of information. This can result in "information overload", making it difficult to filter through the available data to identify helpful data, and interpret such data.

Sometimes, data may be represented in hierarchical form, in which each node in a hierarchical tree represents a particular item of data. Other data is not available in hierarchical form such as flat lists and charts. In some cases, such non-hierarchical data may be better interpreted in non-hierarchical form. Thus, some data is hierarchical, and some data is not.

When represented in hierarchical form, each node in the hierarchical tree is related to connected nodes in a particular way. Such hierarchical trees are sometimes helpful for evaluating certain types of data, and are thus widely used in computing systems and online services. For instances, directories and files are organized hierarchically in a file system to allow users to organize files according to a particular relationship so that the files may be more easily found. Family history charts are organized hierarchically so that the familial relationships of individuals may be quickly ascertained. Social networking sites have hierarchical organizations in which an individual may have lists, and in which lists may contain friends of the individual.

BRIEF SUMMARY

At least one embodiment described herein relates to a user interface that is structured such that a user may provide a designation of a particular data item, and may provide a child characteristic of data items that are to be assigned as child data items of the particular data item. Then, a query, or a query template, may be formulated using the child characteristic and the designated parent data item. This may be repeatedly performed to allow for multiple generations of data items to be formed.

The query may, at some point, be submitted to identify which data items are child data items or the parent data item. The data items that result from the query (or at least a portion of the data items) may then be assigned as child data items of the parent data item. This process may be repeated for each node in the hierarchical tree to discover the child data items of the respective node. In one embodiment, the query execution is postponed until the node is expanded by the user.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, data items are assigned into a hierarchical structure. A user interface permits a user to define, for each generation of a hierarchical tree, the child characteristics for child data items of particular nodes in the hierarchical tree. Then, a query, or a query template, may be formulated using the child characteristic and the designated parent data item. This may be repeatedly performed to allow for multiple generations of data items to be formed. The query may, at some point, be submitted to identify which data items are child data items or the parent data item. The data items that result from the query (or at least a portion of the data items) may then be assigned as child data items of the parent data item. The query may be postponed until the node is expanded by the user.

First, some introductory discussion regarding computing systems will be described with respect to FIG. 1. Then, various embodiments of the formulation of the hierarchical structure will be described with reference to FIGS. 2 through 7C.

Figure 1:
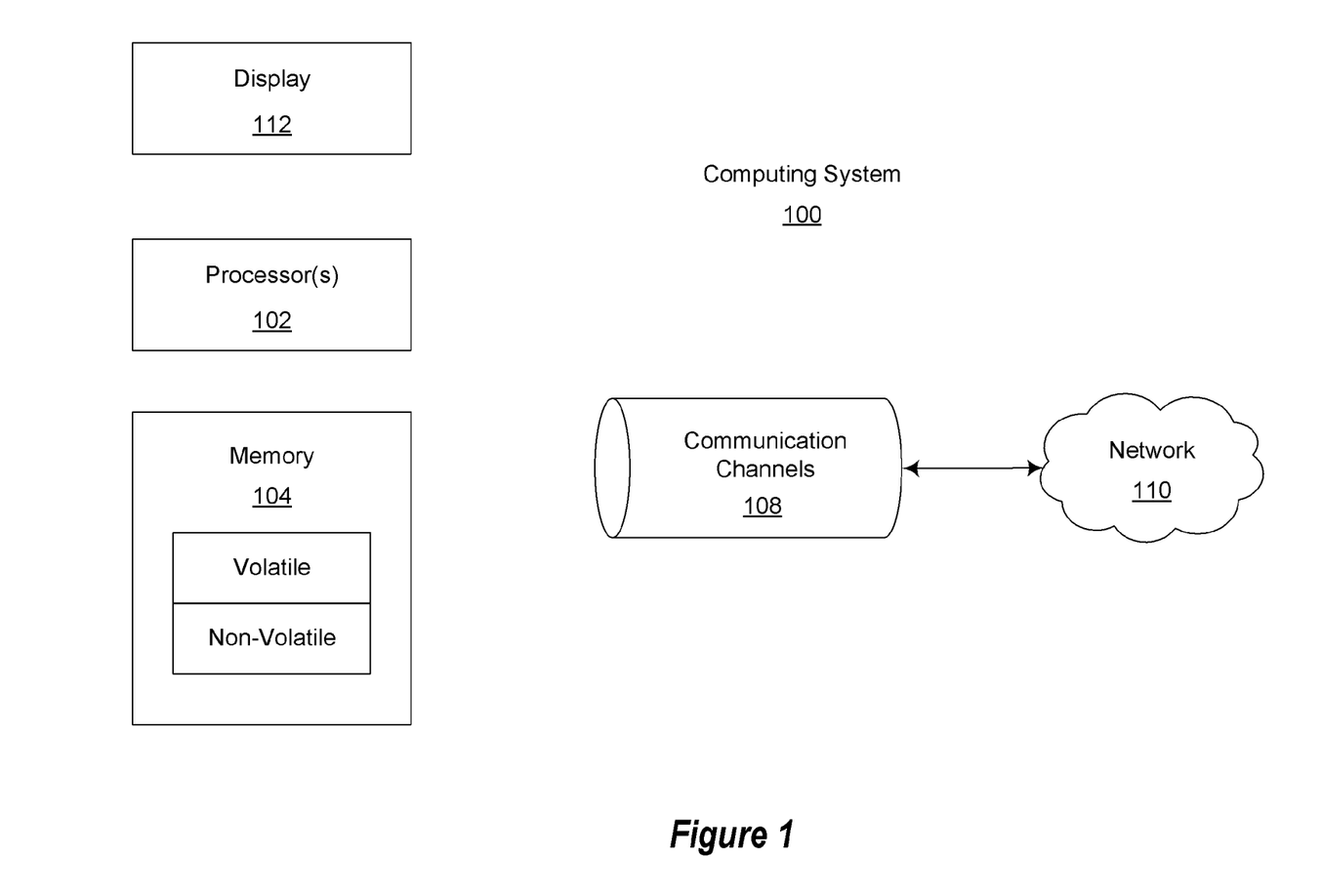
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other message processors over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media. The computing system 100 also may include a display 112 on which may be displayed the user interfaces described herein, as well as other user interfaces.

Embodiments within the scope of the present invention also include a computer program product having computer-readable media for carrying or having computer-executable instructions or data structures stored thereon. Such computer-readable media (or machine-readable media) can be any available media that can be accessed by a general purpose or special purpose computer. By way of example, and not limitation, such computer-readable media can comprise physical storage and/or memory media such as RAM, ROM, EEPROM, CD-ROM, DVD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Figure 2:
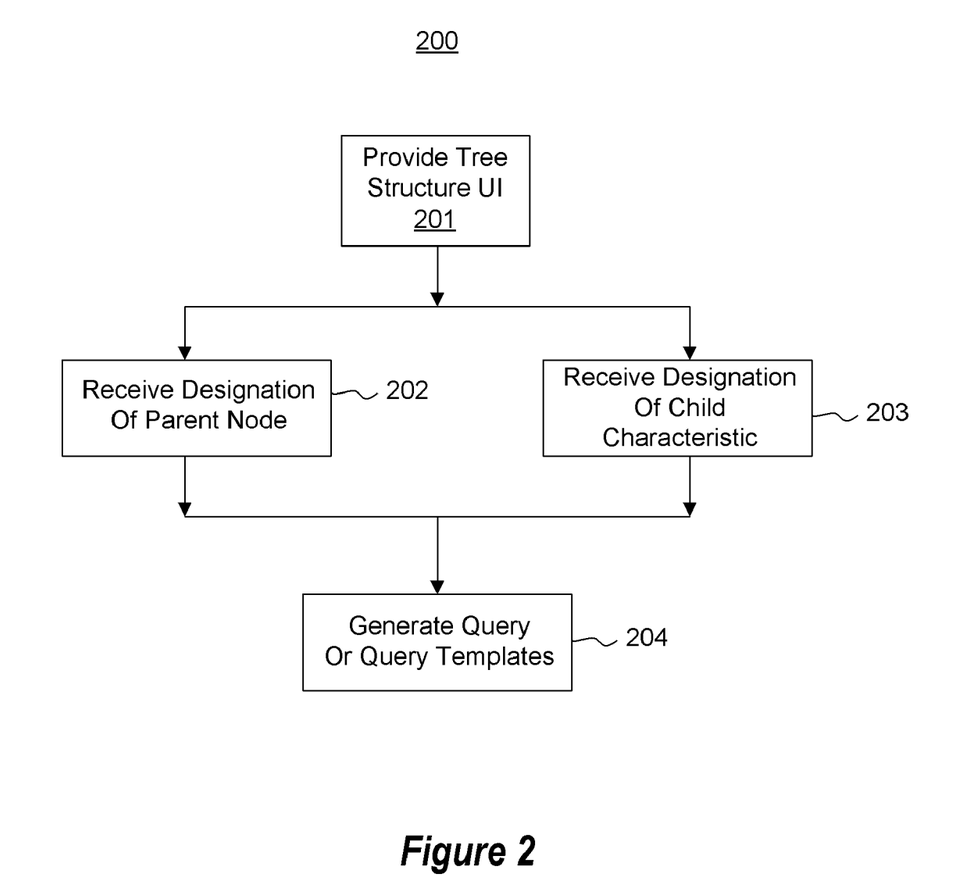
FIG. 2 illustrates a flowchart of a method for defining hierarchical relationships.

FIG. 2 illustrates a flowchart of a method 200 for defining hierarchical relationships between data items. The method 200 may be performed by the computing system 100 of FIG. 1. For instance, the computing system 100 may have access to a computer program product that includes one or more computer-readable media that, when executed by the processing unit 102, causes the computing system 100 to perform the method 200.

Figure 3:
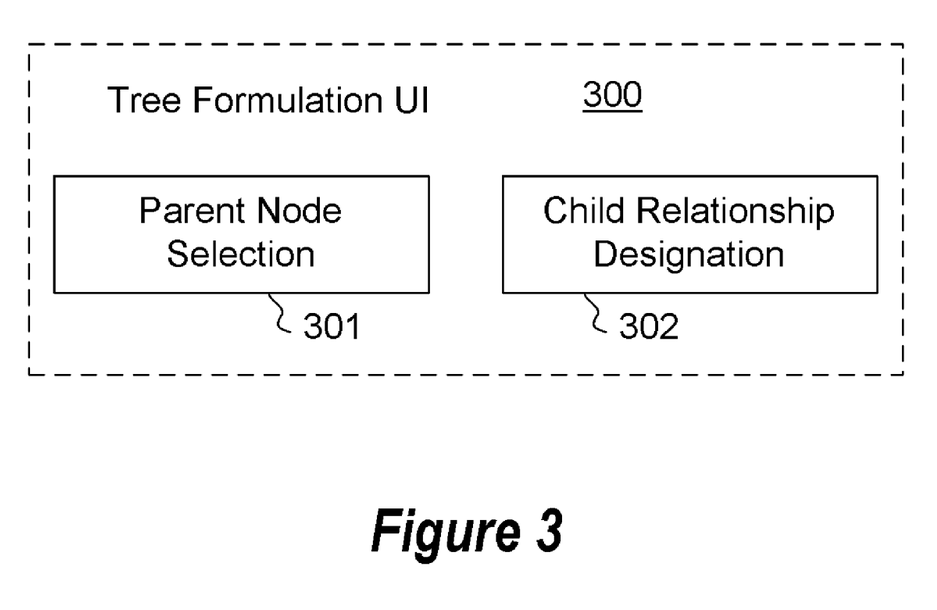
FIG. 3 abstractly illustrates a tree formulation user interface used in the method of FIG. 2.

The method 200 is performed by providing a tree formulation user interface (act 201) that is structured such that a user may provide a designation of a particular data item to serve as a parent data item, and may provide a child characteristic of data items that are to be assigned as child data items of the particular data item. These designations may be provided for each generation in the hierarchy. FIG. 3 abstractly illustrates a tree formulation user interface 300 that provides a parent node selection mechanism 301 and a child relationship designation mechanism 302. The precise form of the user interface 300 is not important to the broader principles described herein.

Figure 4:
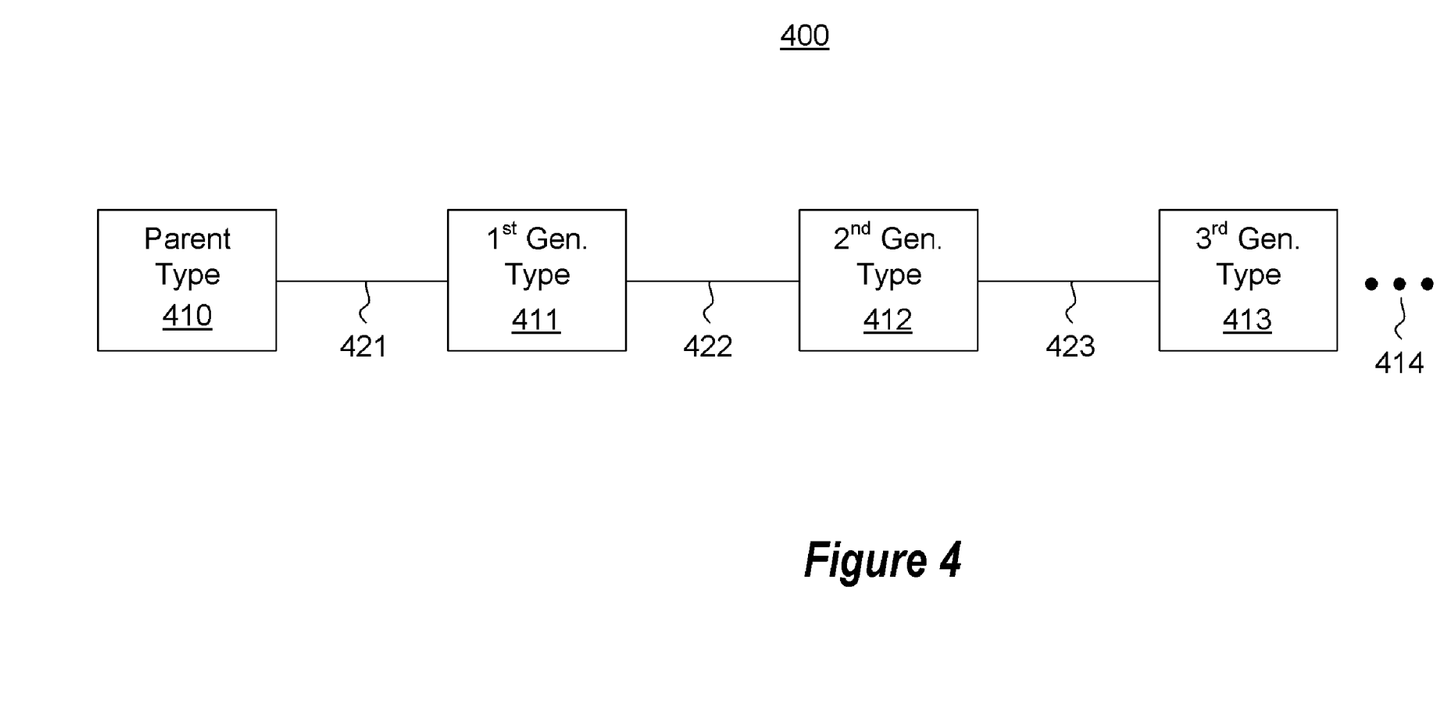
FIG. 4 schematically illustrates a hierarchical relationship graph that may be generated by the method of FIG. 2.

FIG. 4 illustrates a hierarchical relationship graph 400 that includes a parent data type 410, a first generation data type 411, a second generation data type 412, a third generation data type 413, and so forth as represented by the horizontal ellipses 414. The hierarchical relationship graph 400 may be formulated using the user interface 300 of FIG. 3.

The hierarchical relationship graph 400 includes a parent data type 410 which may be selected using the parent node selection mechanism 301 of FIG. 3. The hierarchical relationship graph 400 also includes a child characteristic coupling each of the generational data types. Each child characteristic for each generation may be defined using the child characteristic designation mechanism 302 of FIG. 3. In this description and in the claims, a "child characteristic" may be one or more characteristics, and need not be limited to a single characteristic.

Referring to FIG. 4, first generation child characteristic 421 defines a relationship between the parent data type 410 and the first generation data type 411. Likewise, second generation child characteristic 422 defines a relationship between first generation data type 411 and second generation data type 412, third generation child characteristic 423 defines a relationship between second generation data type 412 and third generation data type 413, and so forth.

At this state, the hierarchical structure of actual data items is not yet constructed. However, the hierarchical graph 400 may be used to construct a hierarchy of data items when applied against a particular context. For instance, the parent data type 410 might be a "person" type. However, the context for applying the person data type 410 might be a social networking site, with the tree being constructed once the individual identity of a particular account is identified, and once access to the constituent data items is granted that will be used to construct the nodes of the hierarchical tree.

For instance, once person A logs into the target social networking site, the person object that represents person A that logged into their account would become the parent data item. At this time, the lists and friends of the user would become ascertainable. Of course, the principles described herein are not limited to social networking applications, nor even to parent data types that describe a person. Nevertheless, in this example, the first generation child relationship might be "all lists belonging to the account of the primary data item". In that case, the child data items might be the lists. The second generation child characteristic might be "all friends within the list". The third generation child characteristic might be "all lists within the account of the corresponding friend", and so forth. An example of a social networking application has been provided as an example only. The principles described herein may apply anywhere where data is to be organized hierarchically.

Referring to FIG. 4, there is no requirement whatsoever that the child characteristic for each generation be the same. For instance, in the above-example, the second generation child characteristic 422 (e.g., all friends within the list node) is different than the first generation child characteristic 421 and the third generation child characteristic 423 (e.g., all lists within the account). In other embodiments, all three child characteristics may be different, of they might be the same. The principles described herein are thus not limited to the type of child characteristic, and whether the child characteristics are the same or different between generations of the hierarchical tree.

Figure 5:
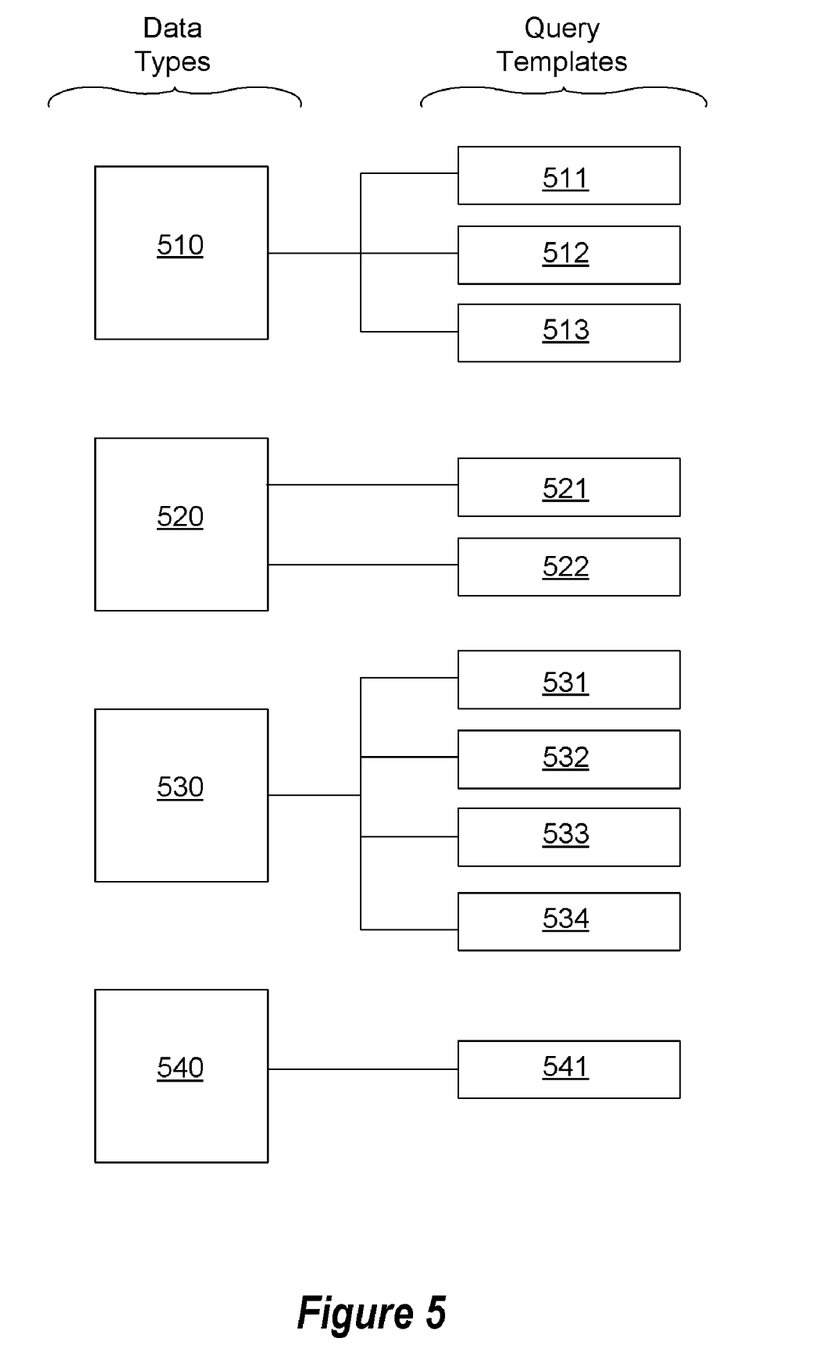
FIG. 5 illustrates a set of data types and associated query template options that may be used to formulate queries or query templates using the hierarchical relationship graph of FIG. 4.

In one embodiment, there may be particular child characteristics that may be selected depending on the data type of the direct parent. The child relationship designation mechanism 302 may thus provide options depending on the data type of the direct parent data type. FIG. 5 abstractly illustrates four data types, each having particular child characteristics that may be selected from and refined (e.g., by selecting a function and parameters to apply to the child characteristic) to thereby formulate a query or a query template that could actually be used to query for children data items. In this description and in the claims, a "query template" is a structure that needs one or more items of data in order to formulate a query that may be submitted. For instance, a query template may require the identity of a parent data item in order to complete the query. For instance, a query might be "Find all data items that represents John Doe's friends in the Gizmo social networking site". A query template might be "Find all data items that represent [insert name of account] in the [insert name of social networking site] social networking site". Here, the query template requires two pieces of information, the name of the account, and the name of the social networking site, in order to complete the query.

Referring to FIG. 5, there are four data types 510, 520, 530 and 540 illustrated, each associated with a different number of child characteristics. The child characteristics might take the form of a query template, that the user may fully or partially populate to formulate a query or more refined template accordingly. In this example, data type 510 is associated with three query template options 511, 512, and 513. Data type 520 is associated with two query template options 521 and 522. Data type 530 is associated with four query template options 531, 532, 533 and 534. Data type 540 only happens to have one query template option 541. FIG. 5 is only provided as an example. There may be any number of data types with any number of query templates. Furthermore, the broader principles described herein are not restricted to having query templates at all dependent upon data types of the parent node. Also, the principles are not limited to any particular child characteristic options depending on the data type of the parent node.

In any case, referring back to FIG. 2, a query template (perhaps partially populated), or a query is automatically generated (act 204) as a result of the designation of the parent data type (act 202), and the designation of each child relationship for each desired generation (act 203).

Figure 6:
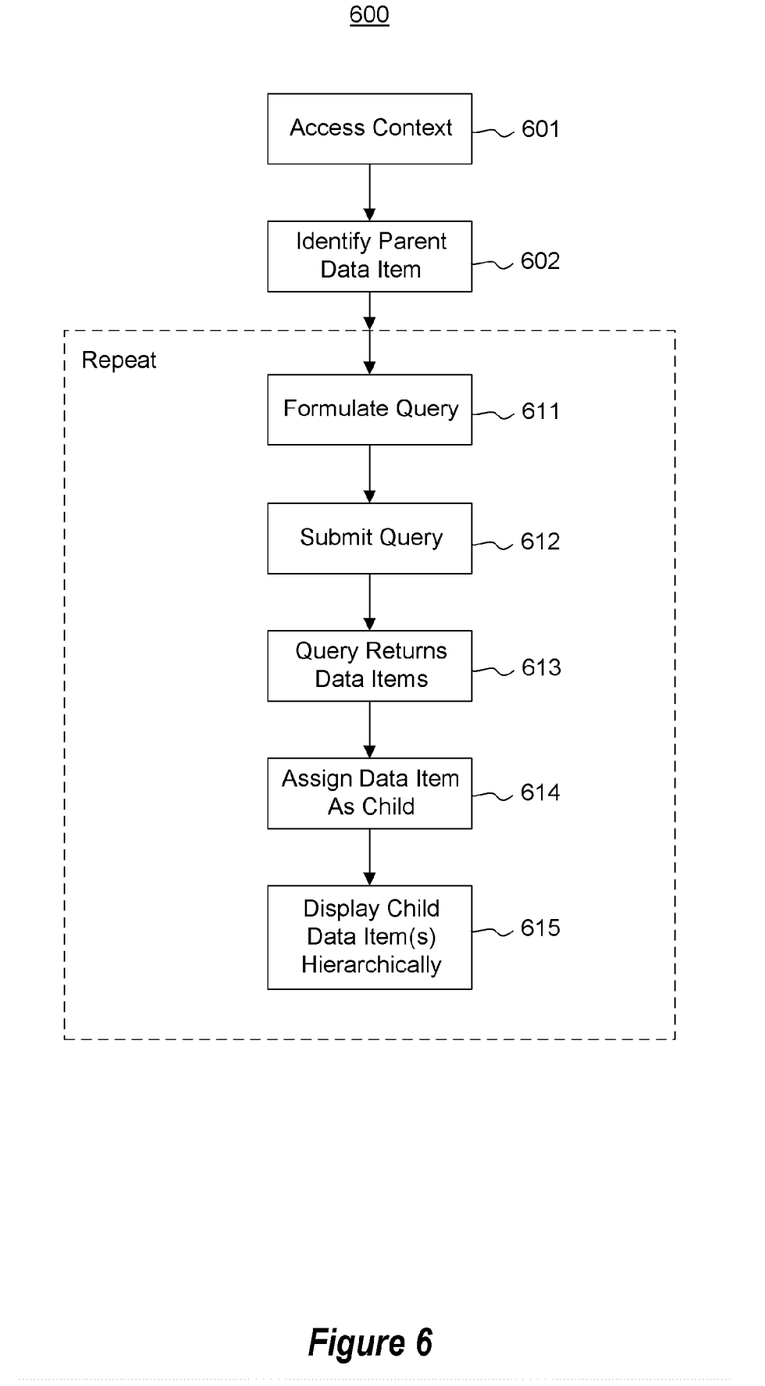
FIG. 6 illustrates a flowchart of a method for using a hierarchical relationship graph such as that of FIG. 4 to formulate a hierarchical tree of data items.

FIG. 6 illustrates a flowchart of a method 600 for using a hierarchical relationship graph and context in order to formulate a hierarchy of data items. In one example that follows, the hierarchical structures 700A, 700B and 700C of FIGS. 7A, 7B, and 7C, respectively, may be created using the method 600 of FIG. 6 and the hierarchical relationship graph 400 of FIG. 4. This is just an example. Nevertheless, to explain the example, FIG. 6 will now be described with respect to FIG. 4 and FIGS. 7A, 7B and 7C.

The method may begin upon accessing the appropriate context (act 601) for the formulation of the hierarchical tree of data items. This means that the method 600 now has access to data items to populate at least a portion of the hierarchical tree, and also has enough context to identify the parent data item based on parent data type 410. Accordingly, at this stage, the method 600 identifies the parent data item based on context (act 602). For instance, in the social networking example, context is obtained once the hierarchical relationship graph 400 is applied to a particular account of a social networking application. The parent data item is thus the owner of the social networking account in this example.

Figure 7A:
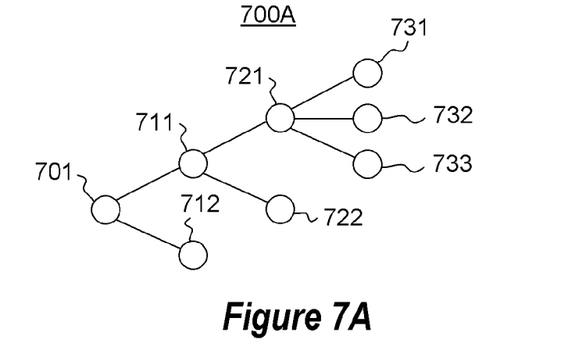
FIG. 7A schematically illustrates an initial visible portion of a hierarchical structure of data items.

The remainder of the method 600 may be repeated recursively in order to formulate the initial visible portions of the hierarchical tree, and on demand to form subsequently expanded and visible portions of the hierarchical tree. FIG. 7A illustrates an example of a hierarchical tree 700A in an initial state. The remaining portions of the method 700 may be repeated for each node in the tree 700A that is not a leaf node.

For instance, with respect to parent node 701, the method 600 formulates a query (act 611) based on a defined first generation child characteristic (see characteristic 421 of FIG. 1), based on the parent data type (see parent data type 410) and based on context. In one embodiment, a query template was created previously based on the first generation child characteristic. Thus, the query template may then be populated with data from the parent data item to complete the query.

The query is then submitted (act 612) resulting in the query returning one or more data items (act 613) that satisfy the defined child characteristic relative to the particular parent data item. Then, the resulting data items are assigned (act 614) as child data items to the parent data item. For instance, child data items 711 and 712 are assigned as children of the parent data item 701. At this stage, the parent data item 701 may be displayed along with the child data items 711 and 712 in a hierarchical manner (act 615). Alternatively, such display may be delayed until more of the tree is formulated, or until the entire tree 700A is formulated.

Acts 611 through 615 are then repeated recursively for all non-leaf nodes. A leaf node is either a node that has no children, or a node that is not expanded. In this case, node 712 is not expanded and is thus a leaf node. Accordingly, acts 611 through 615 are performed for node 711.

With respect to node 711, the method 600 formulates a query (act 611) based on a defined second generation child characteristic (see characteristic 422 of FIG. 4), based on the child data type (see first generation data type 411) and based on context. In one embodiment, a query template was created previously based on the second generation child characteristic. Thus, the query template may then be populated with data from the child data item 711 to complete the query.

The query is then submitted (act 612) resulting in the query returning one or more data items (act 613) that satisfy the defined child characteristic relative to the particular child data item 711. Then, the resulting data items are assigned (act 614) as child data items to the child data item 711. For instance, child data items 721 and 722 are assigned as children of the child data item 711. At this stage, the child data item 711 may be displayed along with the child data items 721 and 722 in a hierarchical manner (act 615). Alternatively, such display may be delayed as previously described.

Acts 611 through 615 are then repeated recursively for the final non-leaf node 721 in the tree 700A. With respect to node 721, the method 600 formulates a query (act 611) based on a defined third generation child characteristic (see characteristic 423 of FIG. 4), based on the child data type (see second generation data type 412) and based on context. In one embodiment, a query template was created previously based on the second generation child characteristic. Thus, the query template may then be populated with data from the child data item 721 to complete the query.

The query is then submitted (act 612) resulting in the query returning one or more data items (act 613) that satisfy the defined child characteristic relative to the particular child data item 721. Then, the resulting data items are assigned (act 614) as child data items to the child data item 721. For instance, child data items 731, 732 and 733 are assigned as children of the child data item 721. At this stage, the child data item 711 may be displayed along with the child data items 721 and 722 in a hierarchical manner (act 615). Alternatively, such display may be delayed as previously described.

Figure 7B:
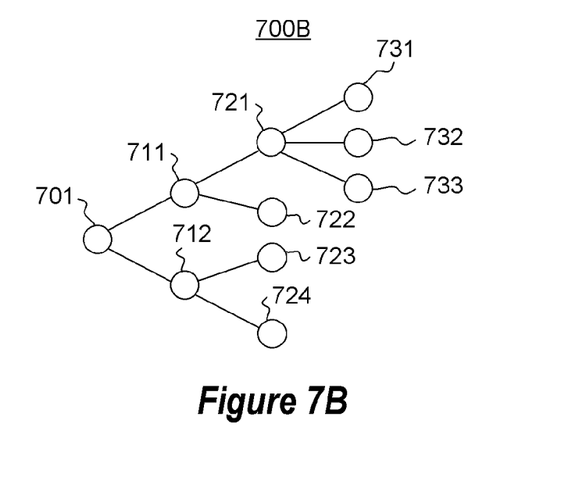
FIG. 7B schematically illustrates the visible tree of FIG. 7A, but with one further node expanded.

Thus, the tree 700A may be generated. The non-visible portions of the tree may be quite large, even perhaps infinite. However, only a portion of the tree is visible in the form of visible tree 700A. FIG. 7B illustrates a visible state 700B of the tree 700A upon expansion of node 712. Upon expanding a node, the acts 611 through 615 may be repeated for node 712 on demand.

Accordingly, with respect to node 712, the query is formed (act 611), submitted (act 612), and the returned data items (act 613) are assigned as child data items (act 614) of the child data item 712. In this case, child data items 723 and 724 are assigned as children of the data item 712.

Figure 7C:
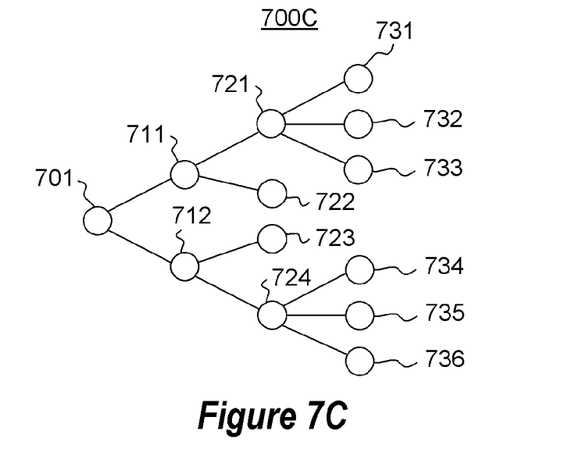
FIG. 7C schematically illustrates the visible tree of FIG. 7B, but with yet another node expanded.

FIG. 7C illustrates a visible state 700C of the tree 700B upon further expansion of node 724. Accordingly, with respect to node 724, the query is formed (act 611), submitted (act 612), and the returned data items (act 613) are assigned as child data items (act 614) of the child data item 724. In this case, child data items 734, 735 and 736 are assigned as children of the data item 724.

Thus process may repeat every time a node is expanded. Thus, portions of trees may be constructed within having to acquire all of the data items that may be used to populate a tree. Instead, the data items may be acquired at least in some cases on demand, thereby reducing the computing resources required to maintain a representation of the tree. Furthermore, more generally, hierarchical structures may be created out of flat lists of data. The principles described herein may further be applied to a wide variety of contexts by simply adjusting the parent data type, and child characteristic for each generation, based on a knowledge of the context in which the hierarchical relationship graph is applied. Thus, the principles described herein permit trees to be formulated from any set of data in any context so long as the data items can be described as having some relationship. The principles described herein may be used to formulate hierarchical structures of data items used for any purpose.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for formulating a hierarchical tree of data items, the method comprising:
    an act of providing a tree formulation user interface that is structured such that a user may provide a designation of a particular data item, and may provide a child characteristic of data items that are to be assigned as child data items of the particular data item, and that includes a mechanism for recursively performing the same to define relationships between multiple generations of data items;
    an act of automatically formulating and submitting a query to discover at least first generation and second generation data items based on the child characteristics provided in the tree formulation user interface; and
    an act of displaying a portion of the hierarchical tree including one node that is not expanded;
    an act of receiving an indication that the user is causing the one node to be expanded;
    in response to detecting the user indication that the one node is to be expanded, an act of formulating and submitting a new query for the one node to discover one or more child data items of the one node, on demand, and while refraining from formulating and submitting the new query prior to detecting the user indication that the one node is to be expanded; and
    after the one or more child data items of the one node are discovered, an act of modifying the displayed portion of the hierarchical tree by displaying the one or more child nodes of the one node in the hierarchical tree as children of the one node.

2. A computer system comprising one or more physical computer-readable media having thereon computer-executable instructions that, when executed by one or more processors of the computing system, cause the computing system to perform the method recited in claim 1.

3. A computer program product comprising one or more physical computer-readable media having thereon computer-executable instructions that, when executed by one or more processors of the computing system, cause the computing system to perform the method recited in claim 1.

4. The computer program product in accordance with claim 3, the method further comprising an act of a user defining the child characteristic.

5. The computer program product in accordance with claim 3, wherein the child characteristic is defined through the tree formulation user interface.

6. The computer program product in accordance with claim 3, wherein the one or more child data includes a plurality of first generation child items.

7. The computer program product in accordance with claim claim 3, wherein a first generation child characteristic that defines a relationship between the one node and a parent of the one node in the hierarchical tree is of a first generation data type and wherein a second generation child characteristic that defines a relationship between the one node and the one or more child data items in the hierarchical tree is of a second generation data type that is a different type than the first generation data type.

8. The computer program product in accordance with claim 3, wherein a first generation child characteristic that defines a relationship between the one node and a parent of the one node in the hierarchical tree is of a first generation data type and wherein a second generation child characteristic that defines a relationship between the one node and the one or more child data items in the hierarchical tree is of a second generation data type that is a same type as the first generation data type.

9. The method recited in accordance with claim 1, wherein a first generation child characteristic that defines a relationship between the one node and a parent of the one node in the hierarchical tree is of a first generation data type and wherein a second generation child characteristic that defines a relationship between the one node and the one or more child data items in the hierarchical tree is of a second generation data type that is a same type as the first generation data type.

10. The method recited in accordance with claim 1, wherein a first generation child characteristic that defines a relationship between the one node and a parent of the one node in the hierarchical tree is of a first generation data type and wherein a second generation child characteristic that defines a relationship between the one node and the one or more child data items in the hierarchical tree is of a second generation data type that is a different type than the first generation data type.

11. The method recited in claim 10, wherein only one of the first generation data type or the second generation data type is a friend data type.

12. The method recited in claim 10, wherein only one of the first generation data type or the second generation data type is a list data type.

\* \* \* \* \*